United States Patent [19]

Katz

[11] Patent Number: 4,999,559

[45] Date of Patent: Mar. 12, 1991

[54] CONTROL ELECTROMAGNET

[75] Inventor: Beatriz E. Katz, Buenos Aires, Argentina

[73] Assignee: Alternative Energy Research Center Inc., Panama

[21] Appl. No.: 288,693

[22] Filed: Dec. 22, 1988

[30] Foreign Application Priority Data

Jan. 4, 1988 [EP] European Pat. Off. ........... 88100015
Jul. 29, 1988 [EP] European Pat. Off. ........... 88112286

[51] Int. Cl.[5] ................ H02P 8/00
[52] U.S. Cl. ................ 318/696; 310/49 R
[58] Field of Search ............. 318/685, 696; 310/49 R, 310/156, 179; 40/446, 463, 466, 470, 473, 475, 476, 482, 484, 489, 493, 494, 501, 503, 611, 614, 615, 619, 903

[56] References Cited

U.S. PATENT DOCUMENTS

| | | | |
|---|---|---|---|
| 3,041,516 | 6/1962 | Bailey | 318/696 X |
| 3,344,325 | 9/1967 | Sklaroff | 318/696 |
| 3,445,741 | 5/1969 | Gerber | 310/49 R X |
| 3,599,069 | 8/1971 | Welch | 318/696 |
| 3,720,865 | 3/1973 | Bregeault | 318/696 X |
| 4,002,022 | 1/1977 | Lopez | 40/470 X |
| 4,095,161 | 6/1978 | Heine et al. | 318/696 |
| 4,161,832 | 7/1979 | Bergamini | 40/466 X |
| 4,532,447 | 7/1985 | Cibie | 310/49 R |
| 4,672,253 | 6/1987 | Tajima et al. | 310/49 R |

*Primary Examiner*—Bentsu Ro
*Attorney, Agent, or Firm*—Lerner, David, Littenberg, Krumholz & Mentlik

[57] ABSTRACT

In a stationary electromagnet creating a multipole-nuclei dipole field for controlling the rotation around its axis of a movable element housing a permanent magnet, each of the electromagnet poles is shaped in the form of a circular arc having a corresponding opening angle from about 40 to about 110 degrees. Also the permanent magnet poles have faces shaped in the form of a circular arc, and in a preferred embodiment the permanent magnet is provided with grooves on both the pole faces, said grooves being parallel to the permanent magnet rotation axis.

17 Claims, 3 Drawing Sheets

CONTROL ELECTROMAGNET

BACKGROUND OF THE INVENTION

1. Field of the Invention

The invention relates to a method and an apparatus for electromagnetically controlling the rotation of a movable element around its axis.

2. Description of the Prior Art

The concept of moving an element housing a permanent magnet is well-known and it has been used in a variety of applications.

One of these applications is the rotation of a movable element around its axis, as has been disclosed in European application Ser. No. 87104786.6 in the name of Alternative Energy Research Center (the present applicant), which is specifically referred to for a preferred embodiment.

In the cited disclosure a cylinder housing a permanent magnet is revolved around its axis by the selective activation of a plurality of "U" shaped electromagnets located on a supporting plate positioned near the cylinder base housing said permanent magnet. The locations of the electromagnet poles (which are substantially perpendicular to the visualizing surface of the panel) correspond to the positions where the rotating cylinder should be able to stop; when one of the electromagnets is activated by its related electrodes, the cylinder is driven by the permanent magnet to the selected position.

The inherent disadvantage of this apparatus mainly resides in the existence of a plurality of electromagnets which may be magnetized by the permanent magnet to such an extent that the rotating element could stop in a wrong position.

To overcome this problem, a pulsed feeding could be used, but this would involve additional problems because of the necessity of a pulse generator and the related pulse amplitude and duration calculations.

Another disadvantage of the disclosed apparatuses is that misalignements of the permanent magnet can occur; that is, the permanent magnet can stop in a position which is offset by several degrees from the required position. These misalignements can dramatically and negatively affect the operation of the whole device, particularly if said device is used for displaying information.

Moreover, a drive control such as that required by the cited application has some other specific requirements:

the coils, being expensive and not easily assemblable elements, should be as few as possible;

the coils should be machine-windable on the related poles also when the electromagnets are inserted in a matrix panel;

the electrodes should be easily connectable with the other circuitry elements;

each position should be reachable from any other position with a single movement;

each selected position should have a stable equilibrium and there should be no other stable equilibrium positions;

the dispersed flux should be significantly reduced such as to avoid any influence on the adjacent magnet equilibriums;

the needed peak power for the rotation should not exceed 1.5 Kwatt/$m^2$;

the electromagnet stator should have a simple geometric configuration, in order to simplify the winding of the coils, and should be easily produced, i.e. by injection molding or deep-drawing;

the stator materials should have high permeability and magnetic induction at saturation.

OBJECTS OF THE INVENTION

An object of this invention is to provide a method and a related apparatus for electromagnetically rotating an element around its axis, stopping said element in a preselected location, which at the same time has the above mentioned requirements.

Accordingly, the invention provides an apparatus for controlling the rotation of an axially symmetrical movable element around its axis, the apparatus comprising a stationary electromagnet controlling the rotation of a permanent magnet housed in said movable element, and having a plurality of evenly spaced poles which each carry at least one coil consisting of one or more windings, characterized in that at least the inner surfaces of said electromagnet poles are shaped in the form of circular arc and in that the opening angle of said arc is from about 40 degrees to about 100 degrees.

The invention also relates to a method for controlling the rotation of a movable element housing at least one permanent magnet around its axis means of a control electromagnet characterized in that said electromagnet is activated by contemporaneously feeding to its coils a current that for each coil has an intensity lower than the critical intensity of the related hysteresis loop, while the sum of said currents has an intensity which is above said critical intensity.

Moreover, the invention relates to a matrix panel formed by a plurality of the above disclosed apparatuses.

BRIEF DESCRIPTION OF THE DRAWINGS

The invention will now be described more in detail, and its advantages more extensively explained, with reference to the accompanying drawing, which are merely illustrative how the invention might be put into effect, and where.

DESCRIPTION OF THE PREFERRED EMBODIMENTS

According to the invention, the apparatus comprises a stationary electromagnet formed by a plurality of poles which are evenly spaced each having at least one coil, consisting of one or more windings.

At least the inner surface of the poles, i.e. the surface which faces the permanent magnet, is shaped in the form of a circular arc. The angular length of the circular arc for each pole can vary from about 40 degrees to about 110 degrees, depending on the number of poles.

The pole number in turn depends on the number of the possible stopping positions required for the movable element. In a display panel element such as that described by EP-A-87104786.6, it is deemed that six stopping positions are sufficient for the average panel. Said six positions can be obtained either with a three-pole or with a six-pole electromagnet. As a three-pole electromagnet is a much simpler apparatus, it will represent the preferred embodiment of this invention.

Figure 1:
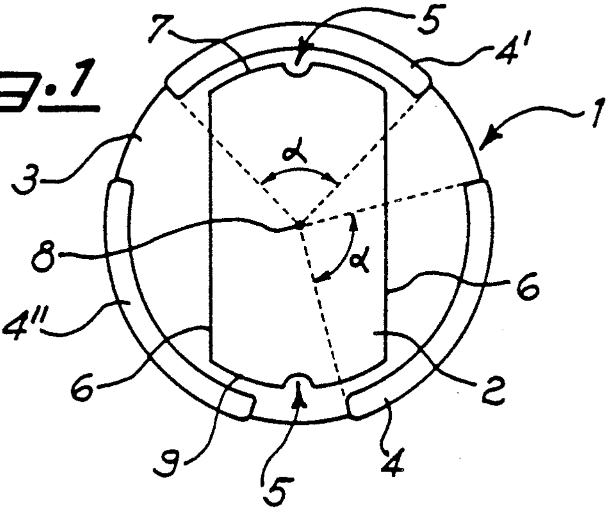
FIG. 1 is a cross sectional view of a first embodiment showing the electromagnet and the permanent magnet.

Referring now to the drawing, wherein like reference numerals designate like or corresponding parts throughout the several views, FIG. 1 shows a cross section of an apparatus formed by an electromagnet 1 and a permanent magnet 2 providing six possible positions. The electromagnet has three poles 4, 4', 4" and a base 3; said poles 4, 4', 4" are shaped in the form of a circular arc having a common center 8 and the length of this circular is such that the related opening angle, which in FIG. 1 is shown by $\alpha$, has a value in the range from about the 70 degrees to about 100 degrees. Actually it was experimentally established that such a range values is dramatically effective to avoid any mispositioning of the permanent magnet, and that in a three-pole stator the optimum value for the angle $\alpha$ is about 82 degrees.

While the disclosed electromagnet can be used with any kind of permanent magnet, the most accurate positioning thereof is achieved when a permanent magnet 2 of the type shown in FIG. 1 is also used.

The magnet 2 has two lateral faces 6 which are substantially parallel and plain, and two arc-shaped faces 7, 9 corresponding to the north and south poles of the magnet 2. These arc-shaped faces can be seen as a part of a circle that is concentric to the circle defined by poles 4–4". In a preferred configuration the opening angle of faces 7, 9 is similar to that of poles 4–4".

The main and most important feature of magnet 2 is that a groove 5 is provided on each face 7, 9; said grooves extend longitudinally extending along faces 7, 9, are positioned at the middle line of said faces and are parallel to the rotation axis 8 of the permanent magnet 2. The magnet flux can thus be correctly directed from pole 4' to magnet 2 through the two portions of face 7 as defined by the groove 5 on said face, and from magnet 2 to poles 4" and 4 through the similar two portions as defined by groove 5 on face 9, or viceversa.

Thus, if the apparatus is correctly dimensioned and assembled, in each selected position of the permanent magnet, a first groove 5 is located at the middle of one pole, and the other groove 5 is located at the middle of the space between the other two poles.

Figure 2:
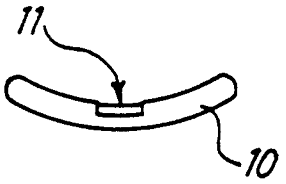
FIG. 2 is a cross section of a pole of the electromagnet having a different configuration.
Figure 3:
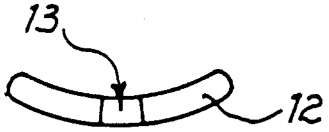
FIG. 3 is a cross section of a third type of pole.

For improved direction control of the magnetic flux, poles 4–4" can be modified as disclosed in FIGS. 2 and 3.

In the embodiment shown in FIG. 2, a groove 11 is provided on the inner side of a pole 10, i.e. on the side which faces the permanent magnet. In the alternative embodiment of FIG. 3 a pole 12 is end-slotted, thus presenting a gap 13 at its upper end. In both cases, the groove 11 and slot 13 are provided at the position where groove 5 of the permanent magnet stops (in front of pole 4'—FIG. 1).

Figure 4:
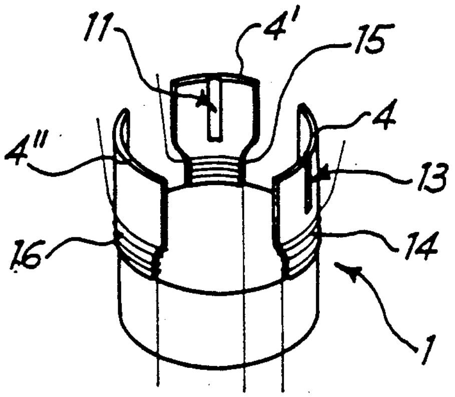
FIG. 4 is a side view of the electromagnet of FIG. 1.

A plain, a grooved and an end-slotted pole are each shown in the perspective view of FIG. 4. Obviously, in a preferred embodiment the electromagnet poles are identical, and generally the most preferred poles are grooved poles.

Figure 5:
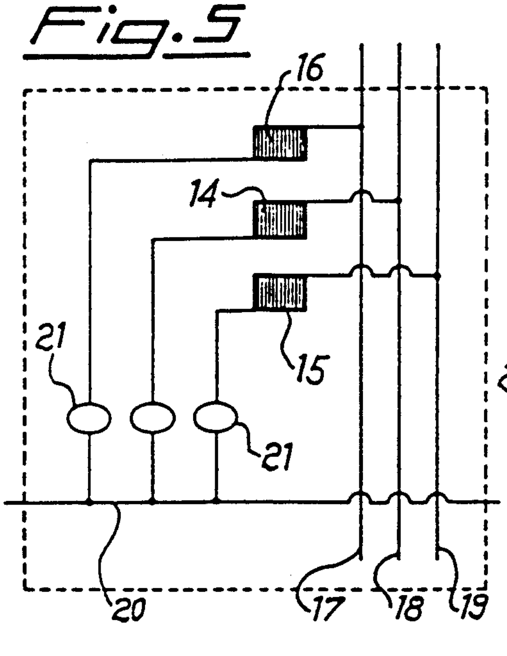
FIG. 5 is a diagram of a possible circuit incorporating the FIG. 4 embodiment.
Figure 6:
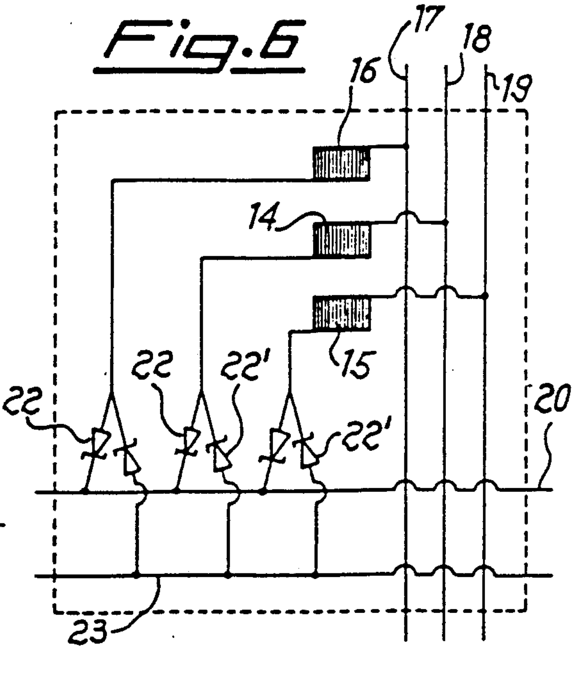
FIG. 6 is a diagram of an alternative circuit incorporating the embodiment of FIG. 4.

As shown in FIG. 4, on each pole 4, 4', 4" is provided a single coil 14, 14 and 16; each of said coils comprises one winding consisting of a preselected number of turns. FIGS. 5 and 6 show two circuitry units related to the FIG. 4 electromagnet. In FIG. 5 the three coils 14–16 are connected (preferably star connected) with a single input electrode 20 through a threshold element 21 such as a discharge tube. The FIG. 6 circuit is essentially identical to the circuit of FIG. 5, differing only in the threshold element which is formed by two Zener diodes 22 and 22'. In this latter embodiment two feeding electrodes 20, 23 are therefore required instead of the single feeding electrode 20 required by the discharge tube 21.

After having applied the required voltage to the input electrode 20 and to the threshold element and grounded one of the output electrodes 17, 18 and 19, the coil connected to the grounded electrode will be activated to generate a dipole field.

In this dipole field one nucleus is a multiple nucleus, while the other one is a monopole nucleus. More specifically, the monopole nucleus consists of the pole where the activated coil is, while the multipole nucleus consists of the two remaining poles which are magnetized with the sign opposite to that of the monopole nucleus by said activated coil.

Referring to FIG. 5, if a suitable voltage +V (which is preferably of at least 70 volts) is applied to electrode 20, and electrode 17 is grounded, the coil 16 will be activated, thus creating on its expansion (or pole) 4" a first magnetic pole, e.g. the South, of a dipole field whose other nucleus will consists of the remaining two poles 4, 4'. The coils 14 and 15 of said two poles 4, 4' respectively, have not been activated but are induction magnetized by said coil 16 with its opposite sign, that is, the North.

The permanent magnet of the rotatable element will therefore position itself with its North corresponding to the South of the dipole field, i.e. to pole 4" while its South will be located half way between poles 4 and 4', which form the North nucleus of said dipole field. As an alternative to the method above disclosed, this invention provides a new method for activating the poles, which "utilizes" the hysteresis loop of the electromagnet material. This method allows the use of a threshold element, to be eliminated thus resulting in a much more simple and economical circuitry. The hysteresis loop of the stator material is shown in the FIG. 7 diagram, where the abscissa corresponds to the intensity I of the current fed to one winding, and the ordinate indicates the value of the related magnetic induction B of the corresponding stator pole.

As is well known, if the intensity I of the current fed to a winding on a pole having a magnetic induction $B_1$, has a value equal to or lower than that of the critical intensity $I_C$, the value of B will not vary from $B_1$; if, on the contrary, the I value is above $I_C$, the value of B will rise to $B_2$. To activate the electromagnet 1, a first coil, e.g. coil 15 on pole 4', is fed along a first direction with a current having an intensity which is sufficient to energize pole 4' but is lower than the critical intensity $I_C$. Identical currents are codirectionally fed to pole 4 and pole 4'' along a direction opposite to that by which the first current is fed to pole 4'. The global effect of these three currents when simultaneously fed to poles 4, 4' and 4'' results in the activation of electromagnet 1, which thus forms a multipole nuclei dipole field. For example, pole 4' will be the north pole while the south pole will be formed by poles 4 and 4'' together.

Figure 8:
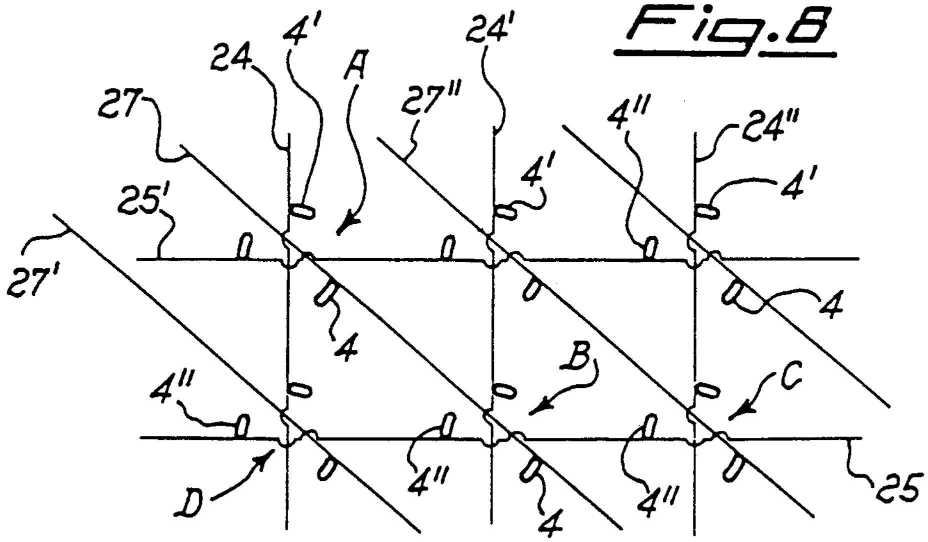
FIG. 8 is a diagram of a matrix area formed by apparatuses according to FIG. 4 and FIG. 7.

The total number of electrodes which are thus needed for each apparatus is three; and a matrix panel formed by a plurality of such apparatuses will have the circuitry schematically shown in FIG. 8, where, in order to have a more simple drawing, poles 4–4'' are represented much smaller than in FIG. 1.

As previously disclosed, each pole of the electromagnet has one coil connected to a single electrode, and each electrode will connect all the poles on the same line, or on the same column or on the same diagonal. In FIG. 8, for instance, all poles 4' on the left column are connected by means of electrode 24; electrode 25 is connecting all poles 4'' of the bottom line; and electrode 27 is connecting all poles 4 positioned on the same diagonal.

The total number of electrodes for a matrix according to the invention will thus be greatly reduced with respect to previous matrixes, and such a matrix is therefore much more simple and easy to produce than any previous matrix, and also, thanks to the apparatuses according to the invention, much more accurate in positioning the elements housing the permanent magnets. To control said elements it is necessary, as previously shown, contemporaneously all of the three electrodes intersecting at the desired pixel. For instance, with reference to FIG. 8, if pixel A and B have to be activated, electrodes 24, 25' and 27 for pixel A and electrodes 24', 25 and 27 for pixel B are fed. Other pixels, for instance pixel C or pixel D are not activated because only one or two electrodes connecting the same (25 for element C; 24 and 25 element B) are fed, so that the critical intensity for controlling the related electromagnet is not reached. This allows all points of the matrix to be controlled with a reduced number of electrodes and control components.

Figure 7:
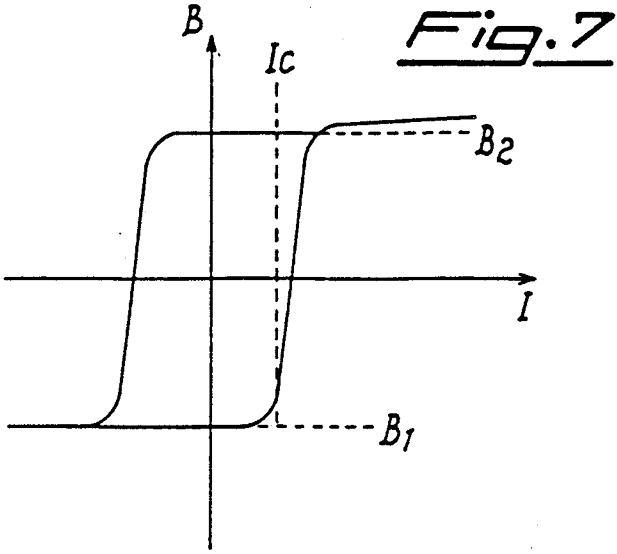
FIG. 7 is a diagram of the hysteresis loop of the preferred stator material.
Figure 9:
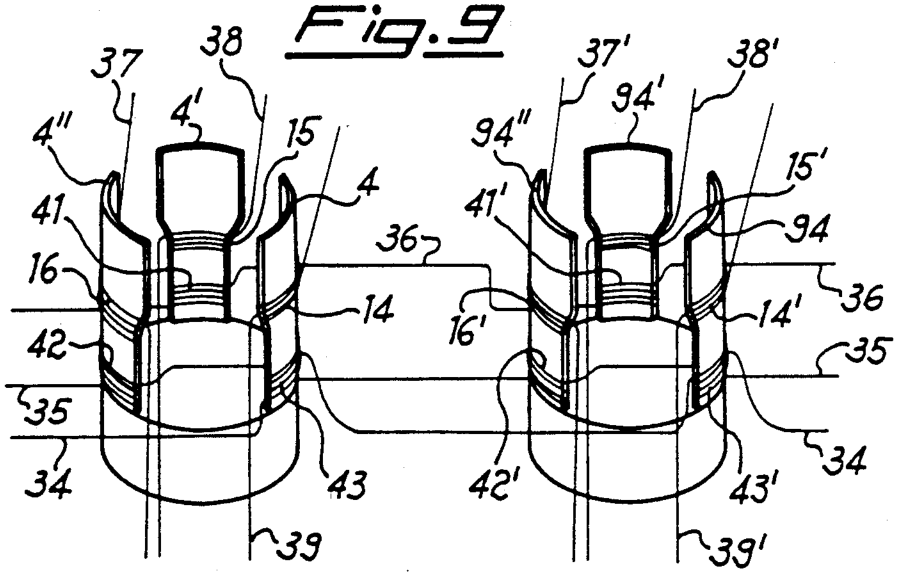
FIG. 9 is a perspective view of an embodiment alternative to the embodiment shown in FIG. 4.

A similar, alternative embodiment of this kind of control device using the hysteresis loop of FIG. 7 is shown in FIG. 9.

In the embodiment of FIG. 9, where two three-pole stators are shown, each pole has two windings connected to two different electrodes. Actually, pole 4' has a first winding 15 connected to electrode 38, and a second winding 41 connected to electrode 36; simirlarly pole 4'' has two windings 16 and 42 connected to electrodes 37 and 35 respectively, and pole 4 has two analogous windings 14 and 43 connected to electrodes 39 and 34 respectively.

It can be noted that in FIG. 9 electrodes 34, 35 and 36 are also connected to windings 43', 42' and 41', respectively; said windings 43', 42' and 41', being wound around poles 94, 94'' and 94' respectively. The electrodes 37', 38', 39' form three other windings, one on each of said poles 94'', 94' and 94 respectively.

Figure 10:
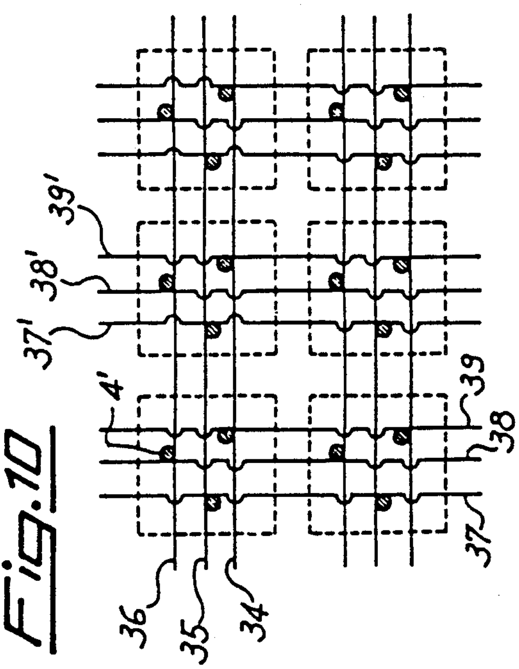
FIG. 10 is a diagram of a matrix area formed by the apparatuses according to FIG. 9.

The same kind of connection between two poles of two different stators can be used also for electrodes 37, 38, 39, as is shown in FIG. 10, which will be later discussed. It is an important feature of this embodiment that the windings formed on different poles by the same electrode, e.g. windings 43 and 43' on poles 4 and 94, are codirectionally wound in order to generate magnetic fields having the same sign. Moreover, it is a preferred feature that, as shown in FIG. 9, corresponding windings formed by the three electrodes on three different poles of the same stator, e.g. windings 14, 15, 16 formed by electrodes 39, 38, 37 respectively, are wound in the same direction.

During operation, if in the apparatus of FIG. 9 the electrode 34 is fed with a current having an intensity in the range from about 0.8 $I_C$ to 1,0 $I_c$, the magnetic field generated by winding 43 will not be able to change the B value of the related pole 4. Obviously, the same situation occurs at winding 43' and pole 94.

If now a suitable current having an intensity in the same value range is codirectionally applied to electrode 39, the resulting magnetic fields generated by the two windings 14 and 43, respectively, and having the same sign, raise the magnetic induction value to $B_2$, thus magnetizing the pole 4. Similarly a suitable current codirectionally applied to electrode 39' will magnetize pole 94 also.

If, on the contrary, the current direction in electrode 39 is such that it flows through winding 14 in a direction opposite to that of winding 43, the pole 4 will not be magnetized.

Obviously, a similar procedure is used when magnetizing or de-magnetizing the other poles of each stator; moreover, as previously described referring to FIG. 5 and 6, the magnetization of one pole will automatically magnetize with the opposite sign the remaining two poles. In FIG. 10 is shown an area of a matrix panel formed by a plurality of circuitry units, each consisting of one stator as shown in FIG. 9; the reference numbers of the circuitry elements are the same in both figures.

The matrix panel of FIG. 10 has no threshold elements; each pole is positioned at the crossing of two electrodes, and each electrode connects a plurality of windings (one winding per each circuitry unit) positioned in the same line or in the same column. As each stator has three poles, in a matrix panel having M lines and N columns, the total number of electrodes will thus be 3N+3M.

Figure 11:
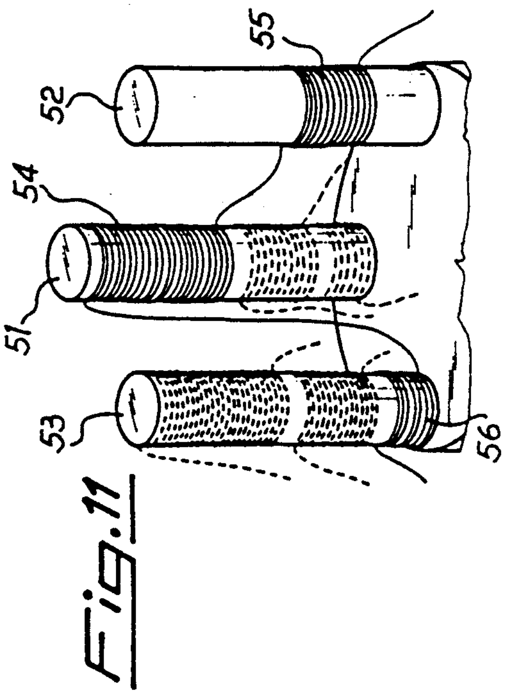
FIG. 11 is a partial perspective view of an alternative embodiment of an electromagnet.
Figure 12:
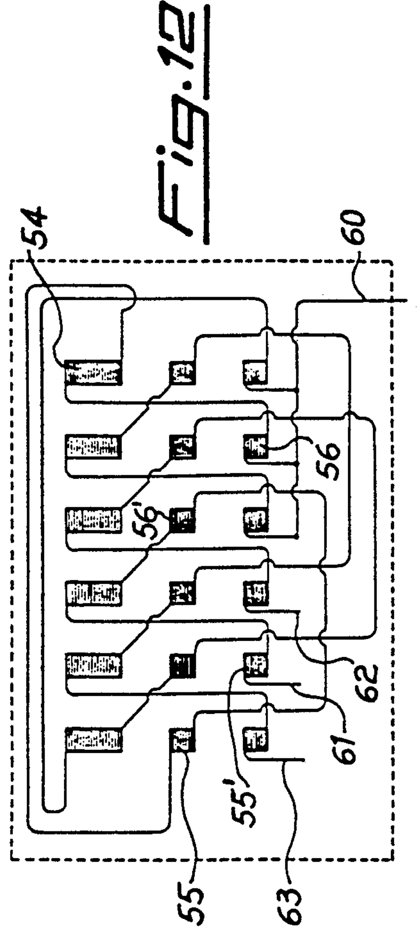
FIG. 12 is a diagram of the circuitry incorporating the FIG. 11 embodiment.
Figure 13:
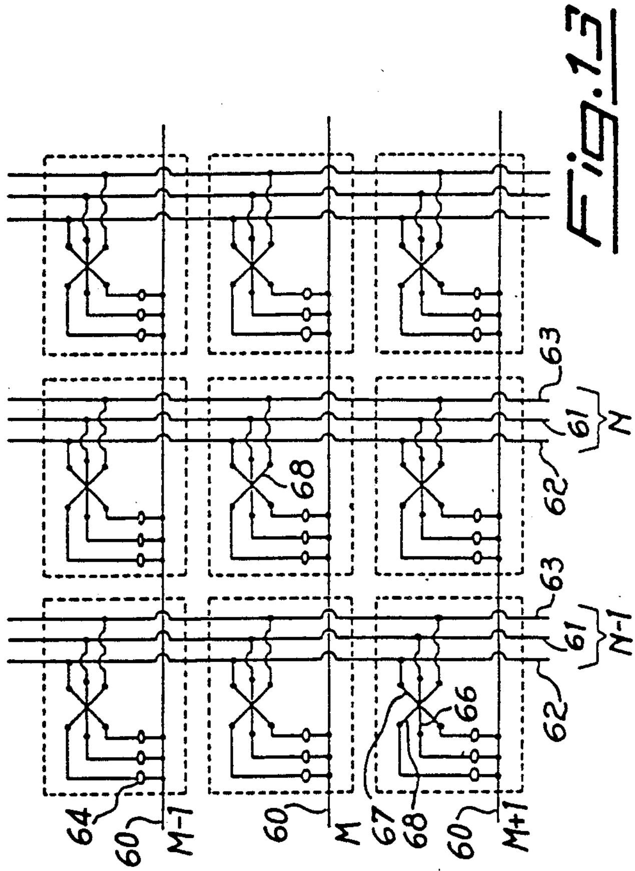
FIG. 13 is a diagram of a matrix area formed by FIG. 11 embodiments.

FIGS. 11, 12 and 13 show an alternative embodiment of an apparatus according to the invention where there are provided six poles for six different stopping positions.

For an easier comprehension FIG. 11 shows only three, cylinder-shaped, poles 51, 52 and 53, but it has to be understood that the actual stator has six arc-shaped poles, similar to those previously disclosed with reference to FIGS. 1–3. In a preferred embodiment, the opening angle of each pole is of about 40 degrees.

On each pole is positioned a coil consisted of three differently dimensioned windings superimposed along the length of each pole. These dimensions depend on the method used to activate the coils and generate the magnetic field.

If the state-of-the-art method which uses threshold elements is utilized, the top winding 54 has a number of turns sufficient to bring the related pole nucleus near to its saturation, while the two others, 55, and 56 have a lesser number of turns, but sufficient to bring the magnetic introduction to a value that is high enough to neutralize the magnetizing force exerted on the inoperative poles by the permanent magnet.

If the hysteresis loop method is used, windings 54, 55 and 56 will have a similar disposition and scaling, but the dimensions will be calculated according to the principles previously disclosed with reference to FIG. 7-10.

If the first case, the three windings 54, 55, 56, are not directly connected together; more advantageously each of them is connected with another winding positioned on another pole nucleus. That is, the first, or main winding 54 on pole 51 is connected with two secondary windings 55, 56 respectively positioned on the two adjacent poles 52 and 53 of the stator.

It should be noted that the three windings connected in series, i.e. the winding 56, 54 and 55 are wound in the same direction, so that when activated they will generate three magnetic fields of different intensities—the windings having different number of turns—but of the same sign—the windings being codirectional.

In the specific disposition of windings 54, 55 and 56, the output of secondary winding 56 is connected to the input of the main winding 54, and the output of the main winding 54 is connected to the input of the other secondary winding 55.

The three windings are thus series connected and form a group which is in turn connected, via the output of winding 55, to the input of the first secondary winding of three other series connected windings, thus forming a second group, in a mirror image to the first one. Each of the last three windings (not shown) are wound in the same direction as the other two ones of the same group and of the first three windings 56, 54 and 55, but they are positioned in such a way that, when viewing them from the top, the current appears to flow through their turns in an opposite direction with respect to that of said first three windings. Moreover these three other windings are so positioned that the two main windings of each group are one in front of the other, and so are the secondary windings.

The input of winding 56 and the output of the last of the six series-connected windings are connected to related electrodes. The same disposition is used for two other series of six windings each, each series being formed by two groups of three co-directional windings.

The resulting circuitry is shown in FIG. 12 where, for an easier comprehension, only some of the components have been referred to. Referring to FIG. 12, the electric current arriving through the feeding electrode 60 activitates the first group of three co-directional windings 56, 54 and 55, creating the first multipole of the magnetic dipole field. From the output of winding 55, the power is directed to the first winding 56', of the second group of three co-directional windings 55', 54', 56'.

The circuit is eventually closed by means of an output electrode 61.

These three windings 55', 54', 56' are symmetrical and mirror images to the corresponding windings 55, 54, 56 and appear to be fed in the opposite way: when activated, they thus create the second multipole nucleus of the dipole field, opposite in sign to the previously cited multipole nucleus created by windings 56, 54 and 55.

The multipole nuclei dipole field thus obtained has no unactivated nuclei, which could be otherwise magnetized by the permanent magnet, so that no undesired positions of said permanent magnet can occur.

In FIG. 13 is shown an area of a matrix panel formed by a plurality of the circuitry units shown in FIG. 12. The reference numbers of the circuitry elements are the same in both pictures. Each circuitry unit has a feeding electrode 60 that is connected through non-linear threshold elements 64 to the three winding series 66, 67, 68 of six windings each. In a preferred embodiment the threshold element 64 is activated by a voltage of at least 70 volts.

Thus having passed through the element 64, the electric current can now activate that one of the three winding groups which is grounded by means of its output electrode 61, 62 and 63 respectively, creating a multipole nuclei dipole field whose North and South disposition depends on the sign of the applied through electrode 60.

The area of the matrix panel shown in FIG. 13 is that which surrounds the circuitry unit positioned at the M line of the N column.

The six possible positions of the permanent magnet located in the M, N unit are identified by the following codes:

(M, 60+; N, 61), (M,60+; N, 62), (M, 60+; N, 63)
(M, 60−; N, 61) (M, 60−; N, 62) (M, 60−; N, 63).

Therefore by connecting the feeding electrode 60 of the M line to a voltage +V and grounding electrode 63 of column N, the permanent magnet located in the rotatable element of the M,N unit will be oriented by the related multipole nuclei dipole field created by the winding series 68 of the M,N unit.

The six pole embodiment of figures 11-13 can be activated also by means of a method based on the hysteresis loop of the stator material. In this case, no threshold element 64 is needed, with the advantages already disclosed, and the circuitry disposition is analogous to the one previously disclosed with reference to FIGS. 7-10.

As for the stator, it could be advantageously made by injection moulding a thermoplastic material with a filler consisting of soft ferrites or soft magnetic alloy powders, or by deep-drawing an iron plate.

From the foregoing description the method and the apparatus of the present invention appear to constitute reliable, simple and economic way of electromagnetically controlling the rotation of a revolvable element; these qualities being even more apparent when considering that, for example, the peak power needed for changing position in an apparatus incorporating a 3% SiFe material stator is about 150mW, and that, thanks to the method used, the apparatus locates the rotating element independently of the initial position, thus avoiding the necessity of memorizing said initial position in order to direct the permanent magnet to a new position.

I claim:

1. A positioning apparatus for rotatably positioning a display element about a central axis comprising, a permanent magnet rotor connected to said display element for rotation therewith, said permanent magnet rotor having arcuate pole faces disposed on opposite sides of a central axis, each of said arcuate pole faces including a centrally disposed groove extending substantially parallel to said central axis, a stationary electromagnet stator including a base element extending around said central axis and a plurality of evenly spaced poles projecting from said base element at equal radial distances from said central axis and substantially parallel to said central axis, each of said plurality of poles having an arcuate inner surface facing toward said central axis, and at least one winding formed on each of said plurality of poles, and circuit means for energizing said windings to magnetize selected ones of said plurality of poles to thereby position said display element.

2. A positioning apparatus as claimed in claim 1 wherein said arcuate inner surface of each of said plurality of poles has an angular length between about 40° and about 110° with respect to said central axis.

3. A positioning apparatus as claimed in claim 2 wherein said arcuate inner surface of each of said plurality of poles has an angular length between about 70° and about 110° with respect to said central axis.

4. A positioning apparatus as claimed in claim 3 wherein said arcuate inner surface of each of said plurality of poles has an angular length of about 82° with respect to said central axis.

5. A positioning apparatus as claimed in claim 1 wherein said arcuate inner surface of each of said plurality of poles has a centrally disposed groove extending substantially parallel to said central axis.

6. A positioning apparatus as claimed in claim 1 wherein each of said plurality of poles has a centrally disposed through slot extending substantially parallel to said central axis.

7. A positioning apparatus as claimed in claim 1 wherein each of said plurality of poles includes one winding having an input end and an output end, and wherein said circuit means for energizing said windings includes a common input electrode connected to each one of said input ends, and a threshold element disposed between said input electrode and each one of said input ends.

8. A positioning apparatus as claimed in claim 7 wherein said threshold element comprises a discharge tube.

9. A positioning apparatus as claimed in claim 7 wherein said threshold element comprises a Zener diode.

10. A positioning apparatus as claimed in claim 1 wherein said electromagnetic stator is formed from a ferromagnetic material dispersed in a thermoplastic material.

11. A positioning apparatus as claimed in claim 1 wherein said electromagnetic stator is formed from a deep drawn iron mass.

12. A positioning apparatus for rotatably positioning a display element about a central axis comprising, a permanent magnet rotor connected to said display element for rotation therewith, said permanent magnet rotor having pole faces disposed on opposite sides of said central axis, a stationary electromagnet stator including a base element extending around said central axis and six evenly spaced poles projecting from said base element at equal radial distances from said central axis and substantially parallel to said central axis, and three series-connected winding assemblies, each of said winding assemblies including, in series order, a first secondary winding, a main winding, a second secondary winding, a first secondary winding, a main winding and a second secondary winding, said windings being disposed on said poles so that one winding of each said winding assembly is disposed on each one of said six poles and so that one of the first secondary windings, one of the main windings and one of the second secondary windings of each of said winding assemblies are disposed on each one of said six poles, each one of said main windings having a preselected number of turns wound in a predetermined direction, and each of said first and second secondary windings having a number of turns less than said preselected number of turns and would in said predetermined direction, and circuit means for energizing said windings to magnetize selected ones of said six poles to thereby position said display element.

13. A positioning apparatus as claimed in claim 12 wherein each one of said first secondary windings has a predetermined number of turns and each one of said second secondary windings has a number of turns less than said predetermined number of turns.

14. A positioning apparatus as claimed in claim 13 wherein each of said six poles has an arcuate inner surface facing towards said central axis, and said pole faces of said permanent magnet rotor are arcuately shaped, each of said arcuate pole faces including a centrally disposed groove extending substantially parallel to said central axis.

15. A positioning apparatus as claimed in claim 14 wherein said arcuate inner surface of each of said six poles has an angular length of about 40° with respect to said central axis.

16. A positioning apparatus as claimed in claim 14 wherein said arcuate inner surface of each of said six poles has a centrally disposed groove extending substantially parallel to said central axis.

17. A positioning apparatus as claimed in claim 14 wherein each one of said six poles has a centrally disposed through slot extending substantially parallel to said central axis.

* * * * *

UNITED STATES PATENT AND TRADEMARK OFFICE
CERTIFICATE OF CORRECTION

PATENT NO. : 4,999,559
DATED : March 12, 1991
INVENTOR(S) : Beatriz E. Katz

It is certified that error appears in the above-identified patent and that said Letters Patent is hereby corrected as shown below:

Column 2, line 22, after "form of" insert --a--.
Column 2, line 27, after "axis" insert --by--.
Column 2, line 42, "drawing" should read --drawings--.
Column 2, line 43, after "illustrative" insert --of--.
Column 3, line 30, after "lar" insert --arc--.
Column 3, line 33, after "range" insert --of--.
Column 3, line 50, cancel the word "extending".
Column 4, line 12, "14" (second occurrence) should read --15--.
Column 4, line 42, "consists" should read --consist--.
Column 5, line 35, before "contemporaneously" insert --to-- and after "contemporaneously" insert --feed--.
Column 5, line 42, after "25" insert --for--.
Column 6, line 66, "introduction" should read --induction--.
Column 8, line 59, "a" should read --said--.

Signed and Sealed this

First Day of December, 1992

*Attest:*

DOUGLAS B. COMER

*Attesting Officer*

*Acting Commissioner of Patents and Trademarks*